United States Patent [19]

Hatsutori

[11] Patent Number: 4,818,167

[45] Date of Patent: Apr. 4, 1989

[54] TAPERED SCREW MEMBER HAVING GUIDE MEANS

[75] Inventor: Seiji Hatsutori, Nagoya, Japan

[73] Assignee: Daidotokushuko Kabushiki Kaisha, Aichi, Japan

[21] Appl. No.: 943,853

[22] Filed: Dec. 22, 1986

Related U.S. Application Data

[63] Continuation of Ser. No. 599,436, filed as PCT JP83/00248 on Aug. 1, 1983, abandoned.

[30] Foreign Application Priority Data

Feb. 18, 1982 [JP] Japan .................................. 58-26753
Aug. 2, 1982 [JP] Japan .................................. 57-135459
Apr. 8, 1983 [JP] Japan .............................. 58-52945[U]

[51] Int. Cl.⁴ ........................ F16B 25/00; F16B 35/04
[52] U.S. Cl. .................................... 411/386; 411/426; 411/437; 285/334
[58] Field of Search .................... 411/18, 262–264, 411/299, 305, 306, 318, 251, 252, 383, 384, 399, 386, 426, 412, 941.1; 285/333, 334, 332.2, 355

[56] References Cited

U.S. PATENT DOCUMENTS

| | | | |
|---|---|---|---|
| 2,079,692 | 5/1937 | Lapointe | 411/426 |
| 2,150,221 | 3/1939 | Hinderliter | 285/333 |
| 3,167,333 | 1/1965 | Hall et al. | 285/333 |
| 3,762,745 | 10/1973 | Cunningham | 411/437 |

FOREIGN PATENT DOCUMENTS

| | | | |
|---|---|---|---|
| 511118 | 3/1955 | Canada | 411/302 |
| 1117840 | 3/1956 | France | 411/262 |
| 393675 | 6/1933 | United Kingdom | 411/411 |

Primary Examiner—Neill Wilson
Attorney, Agent, or Firm—Armstrong, Nikaido, Marmelstein & Kubovcik

[57] ABSTRACT

A tapered screw member provided with a tapered external thread or a tapered internal thread, which comprises disposing a guide means somewhat higher than the crest of another tapered thread at a position connecting to the crest of the tapered external thread or the tapered internal thread, thereby engaging tapered threads smoothly, easily and quickly.

11 Claims, 14 Drawing Sheets

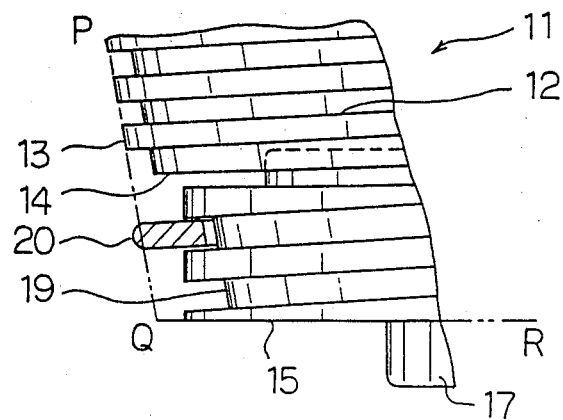
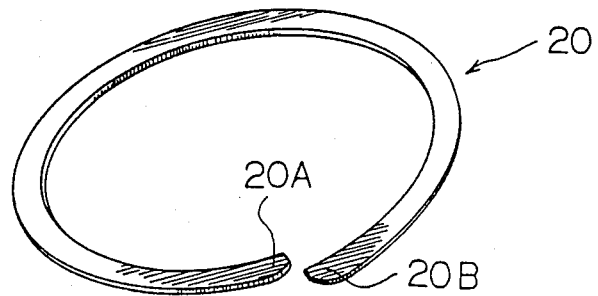
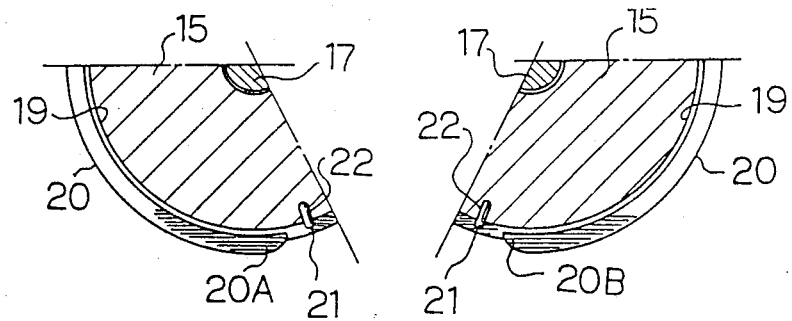

TAPERED SCREW MEMBER HAVING GUIDE MEANS

This application is a continuation of application Ser. No. 599,436 filed as PCT JP83/00248 on Aug. 1, 1983, now abandoned.

TECHNICAL FIELD

This invention relates to a tapered screw member with tapered threads provided thereon and, more particularly, to a tapered screw member with a guide means for inducing an engagement with another tapered screw member disposed at a position connecting to a thread provided on the tapered screw member.

BACKGROUND ART

A taper round thread, a taper buttless thread or the like is provided on, for example, an oil well pipe thread hitherto according to API (Americal Petroleum Institute) Standards, such tapered screw for oil well pipes is subjected to a fitting inspection on an API thread gauge according to the above-mentioned API Standards, thereby controlling and assuring quality. A high precision will particularly be ensured on the oil well pipe thread for its purpose, a measuring item of the tapered threads then comes in taper, lead, depth, angle, coincidence with shaft center, stand-off and others, and the basic standoff on a thread gauge must come exactly within a tolerance of the Standards after all. The standoff is then expressed such that an effective diameter of thread is predetermined for its tolerance so as to allow an interchangeability between pipes, a thread gauge having a basic diameter of thread is used for measurement of the diameter of thread, the gauge is engaged with a measuring object, the diameter of thread is then decided for dimension according to a distance between a reference plane of the thread gauge and a reference plane of the measuring object, and the distance is called stand-off.

Such tapered thread fitting inspection is carried out currently on a hand tight system in the world, and, for example, a tapered external thread gauge 1 with a tapered external thread 2 provided on the outer periphery is engaged, as shown in FIG. 1, with a tapered internal thread coupling 4 with a tapered internal thread 5 provided on the inner periphery by means of a handle arm 3 of predetermined length as aligning shaft centers of both the two carefully so as not to keep the two inclined relatively and also not to mar the tapered thread surface, and whether or not a stand-off value at the time of ending the clamping on a predetermined torque (a distance between a portion 6 whereat the tapered external thread 2 of the tapered external thread gauge 1 is engaged perfectly and a top end surface 7 of the tapered internal thread coupling 4 in FIG. 1) comes within allowable limits determined separately is measured visually and so recorded. However, if a crest 8 of the tapered external thread 2 comes in contact with a crest 9 of the tapered internal thread 5 in this case, then a so-called "biting phenomenon" or "galling phenomenon" may take place to hinder a smooth engagement, and the phenomena are apt particularly to occur where both the two threads are buttless threads. In case "biting phenomenon" or the like has taken place, the contact state is cleared by reversely rotating the tapered external thread gauge 1 as giving a slight shock or likewise thereto, a similar operation is repeated carefully so as not to incur such "biting phenomenon" or the like, a portion whereat both the two start for engagement is detected sensuously, then an engaging work of both the two must be recommenced after the tapered external thread gauge 1 is rotated to descent. Hence, a skill is somewhat required for this kind of tapered screw member fitting inspection and engaging work. Moreover, a considerably long time is required for setting work at site to inefficiency, and the tapered thread surface is capable of being damaged to an unavoidable defect.

DISCLOSURE OF INVENTION

An object of this invention is to provide a tapered screw member provided with a guide means, wherein a portion whereat tapered threads start for engagement is detected automatically to prevent "biting phenomenon" or the like from taking place at the time of engagement. Furthermore, if a tapered internal thread member and a tapered external thread member are kept deviating even slightly from the shaft center, an engagement of both the two is induced smoothly to centering, thereby facilitating a subsequent full engagement.

The gist of this invention is pointed out such that a guide means for inducing an engagement smoothly with another tapered screw member at a position connecting to a tapered thread provided on a tapered screw member. The position connecting to a tapered thread in the tapered screw member refers to a part of the tapered thread, or a portion on the virtual extension from the tapered thread for that outside the tapered screw. Next the guide means can be given in a continuous projecting streak like a round of the tapered thread or in one piece only like a projection or in plural piece intermittently. Then, a height of the guide means is somewhat higher than the height formed by connecting crests of the tapered threads, and the shape is given in pilot ring, leaf, projecting streak or projection. Further it can be provided solidly and divisibly or solidly and indivisibly. Then, the guide means is preferable to have the nose formed in a rounded angle in section, and in case the gauge is used repeatedly for fitting operation, the guide means will preferably be elastic, but in case it is used one time only, the guide means may be such one as will cause a plastic deformation.

BRIEF DESCRIPTION OF DRAWINGS

FIG. 2 to FIG. 26 represent embodiments of this invention, wherein

FIG. 2 is a front view, partly cut away, representing a state in a fitting inspection of the tapered internal thread coupling according to the tapered external thread gauge with a pilot ring fitted loosely on an adapter mounted on an end of the gauge, FIG. 3 is an enlarged fragmentary sectional view of a section A indicated in FIG. 2, FIG. 4 is a perspective view of the pilot ring, FIG. 5 is a fragmentary sectional plan view taken on line V—V of FIG. 2, FIG. 6 is a fragmentary sectional plan view taken on line VI—VI of FIG. 2.

FIG. 7 is a fragmentary sectional view representing a locked state where the pilot ring is varied, FIG. 8 is a side view representing a locked state where a guide means according to a set of leaves coming in three is provided on the end.

FIG. 9 is an enlarged fragmentary sectional view taken on line IX—IX of FIG. 8.

FIG. 10 is a front view, partly cut away, representing a state in a fitting inspection with an oil well pipe with a tapered external thread or a tool joint according to a tapered internal thread gauge with a pilot ring fitted loosely on an adapter mounted on the end.

FIG. 11 is a plan view taken on line XI—XI of FIG. 10.

FIG. 12 is a front view, partly cut away, representing a state in a fitting inspection of the tapered internal thread coupling according to the tapered external thread gauge with intermittent projections provided on an adapter mounted on the end.

FIG. 13 is a plan view taken on line XIII—XIII of FIG. 12.

FIG. 14 is a front view of the tapered external thread gauge with a continuous projection provided on an adapter mounted on the end.

FIG. 15 is a front view, partly cut away, representing a state where the pilot ring of a protector comes in contact with a tapered external thread of the pipe.

FIG. 16 is a perspective view of the pilot ring in FIG. 15.

FIG. 17 is a longitudinal sectional view taken on line XVII—XVII of FIG. 15.

FIG. 18 is a front view, partly cut away, representing a state where a linear body of the protector comes in contact with a tapered internal thread of the coupling.

FIG. 19 is a longitudinal sectional view taken on line XIX—XIX of FIG. 18.

FIG. 20 is a front view, partly cut away, representing a state where a projecting streak provided solidly on the protector comes in contact with a tapered internal thread of the coupling.

FIG. 21 is a front view, partly cut away, representing a state where a ring provided on the protector comes in contact with a tapered internal thread of the coupling.

FIG. 22 is a sectional view taken on line XXII—XXII of FIG. 21.

FIG. 23 is a front view, partly cut away, representing a state where a projection provided solidly on the protector comes in contact with an external thread of the pipe.

FIG. 24 is a longitudinal sectional view taken on line XXIV—XXIV of FIG. 23.

FIG. 25 is a front view, partly cut away, of the protector with a slit formed on a side of the projecting streak provided solidly.

FIG. 26 is a side view, partly cut away, of an inspecting apparatus for fitting of tapered threads.

BEST MODE FOR CARRYING OUT THE INVENTION

The invention will now be described of its embodiments with reference to the accompanying drawings.

Figure 2:
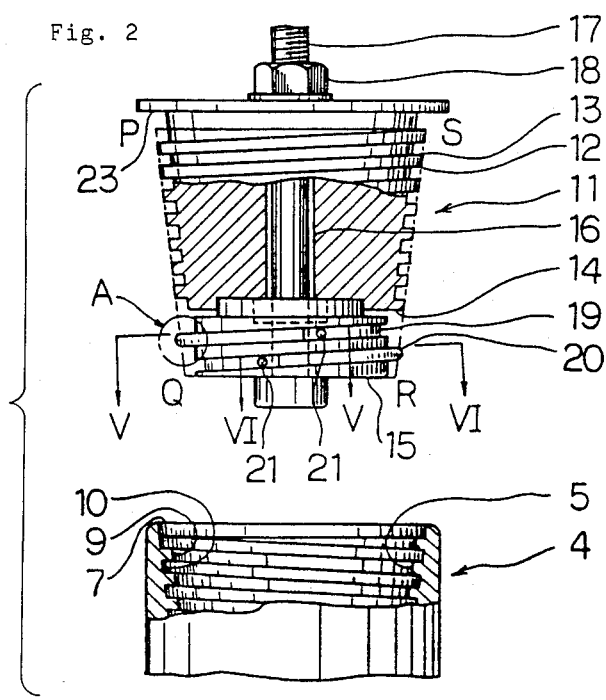

In FIG. 2 and FIG. 3, a numeral 11 denotes a tapered external thread gauge with a tapered external thread 12 having a crest 13 provided on its outer periphery, an adapter 15 is mounted on a nose 14 of the tapered external thread gauge 11, the adapter 15 is adjusted concentrically with the tapered external thread gauge 11 by a mounting member 17 and a nut 18 inserted in a center hole 16 formed axially of the tapered external thread gauge 11 and thus fixed on the nose 14. A numeral 19 denotes a concave groove provided on an outer periphery of the adapter 15, which is U- or V-shaped, semicircular or the like in section and so formed at the same pitch and lead angle as the tapered external thread 12 for ready connection to the crest 13 of the tapered external thread 12. A numeral 20 denotes a pilot ring working as a guide means fitted loosely and contractibly in the concave groove 19, formed in an annular body having a cut with metal, plastics, rubber or the like, the pilot ring 20 is almost rectangular in section with the outer periphery presenting almost semicircular (round angular shape or square shape with an end of the outer periphery R-shaped being acceptable), a diameter of the outer periphery is somewhat larger than the diameter of a circumference of a virtual circular truncated cone P - Q - R - S connecting crests 13, 13 of the tapered external thread 12. Further a diameter of the inner periphery of the pilot ring 20 is somewhat larger than the bottom diameter of the concave groove 19 so as to cope with a contraction at the time of engagement, the thickness is somewhat smaller than the width of the concave groove 19, and it is formed thus in coil long enough to surround an outer periphery of the adapter 15 at about one turn along the concave groove 19, further both ends 20A, 20B are displaced, as shown in FIG. 4, by a distance corresponding to one pitch or so of the tapered external thread 12.

In FIG. 5 and FIG. 6, a numeral 21 denotes a stop pin fitted loosely in the concave groove 19 and also fitted in a hole 22 perforated at a position permitting a circumferential contraction of the pilot ring 20.

Next, the tapered external thread gauge 11 with such adapter 15 will be described of its working mode for fitting inspection of the tapered threads.

Figure 1:
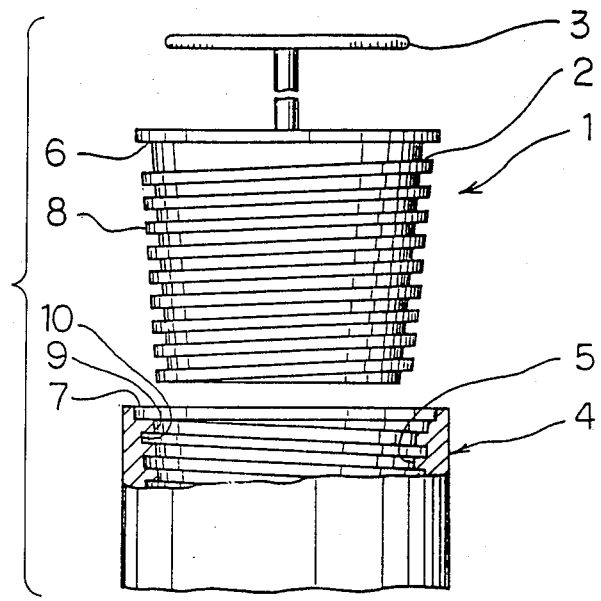
FIG. 1 is a front view, partly cut away, representing a state of a conventional hand-tight API Standard tapered external thread gauge and a tapered internal thread coupling in fitting inspection.

First, the tapered external thread gauge 11 is disposed, as shown in FIG. 2, over the tapered internal thread coupling 4 similar to that of FIG. 1 so as to come on almost the same axis, and when the tapered external thread gauge 11 is led to descend slowly to the tapered internal thread coupling 4 side by a suitable means, the pilot ring 20 which is kept somewhat higher than the crest 13 comes in contact with the crest 9 of the tapered internal thread 5 immediately before the crest 13 of the tapered external thread 12 contacts the crest 9 of the tapered internal thread 5, and the pilot ring 20 is contracted a little inside according to the elastic action. Next, when the tapered external thread gauge 11 descends further somewhat, the pilot ring 20 is fitted in a root 10 of the tapered internal thread 5, expanded on its resilience and then resets to an original state fitted loosely in the concave groove 19. Consequently, a pitch of each tapered thread of the tapered external thread gauge 11 and the tapered internal thread coupling 4 is thus automatically aligned, and when the tapered external thread gauge 11 is rotated to descend under such state, the crest 13 of the tapered external thread 12 coming after the pilot ring 20 is induced to the root 10 of the tapered internal thread 5, therefore the tapered external thread 12 and the tapered internal thread 5 are adjusted on the same shaft center despite a slight deviation from the shaft center between both the two, and thus the two are smoothly engaged with each other.

The tapered external thread gauge 12 is then engaged with the tapered internal thread coupling 4 by having a necessary clamping torque given thereto, and whether or not a stand-off value (distance between a portion 23 whereat the tapered internal thread 12 has been engaged and an upper end surface 7 of the tapered internal thread coupling 4) which is obtained when the clamping ends comes within allowable limits is measured visually and so recorded. Then, the tapered external thread gauge 11 is reversed to ascend by a suitable means and released from engagement with the tapered internal thread coupling 4, thus finishing the fitting inspection of the tapered internal thread 5.

Figure 7:
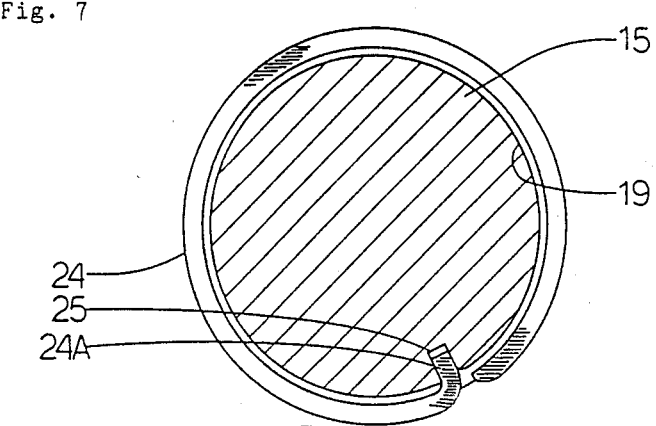

In the above embodiment, the pilot ring 20 is locked by the stop pins 21, 21 fitted in the hole 22 perforated in the surface of the adapter 15 near both the ends 20A, 20B, however, in the case of a pilot ring 24 with one end bent inside to form a leg 24A as shown in FIG. 7, it can be locked simply by fitting the leg 24A in a corresponding hole 25 perforated in the adapter 15, and thus various variants will be conceivable for the locking method otherwise. Further a holding member like a ball retainer in a ball bearing which fits loosely to hold a suitable number of balls at predetermined intervals is fitted in the concave groove 19 of the adapter 15. The holding member is formed in a contractible coil similar to the above-mentioned pilot ring 20 for diameter of the inner periphery, thickness, fitting length and others. An annular body with both the ends open which is constituted to have a diameter formed by connecting radial uppermost surfaces of the balls in the state fitted in the concave groove 19 made somewhat larger than the diameter of a circumference of the above-mentioned virtual circular truncated cone P - Q - R - S can be arranged as the guide means, or a holding part for each ball of the above-mentioned holding member is formed somewhat slender radially to move each ball radially. A suitable elastic member is interposed on a lower side of the ball in the holding part, thereby positioning each ball normally to a radial outermost side in the holding member. Such holding member is fitted in the concave groove 19, and thus a diameter connecting radial uppermost surfaces of the balls at the above-mentioned position can be made somewhat larger than the diameter of a circumference of the above-mentioned virtual circular truncated cone P - Q - R - S. Then in the above constitutions, when the guide means comes in contact with the tapered screw, each ball is rotated to contract the guide means, therefore a resistance is minimized in this case, and thus the guide means is induced and fitted smoothly in the root of the tapered internal thread, thereby aligning pitches of both the tapered threads automatically likewise.

Figure 8:
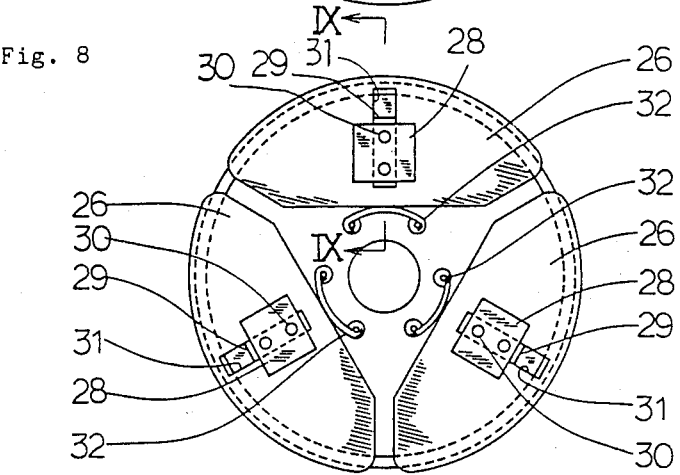
Figure 9:
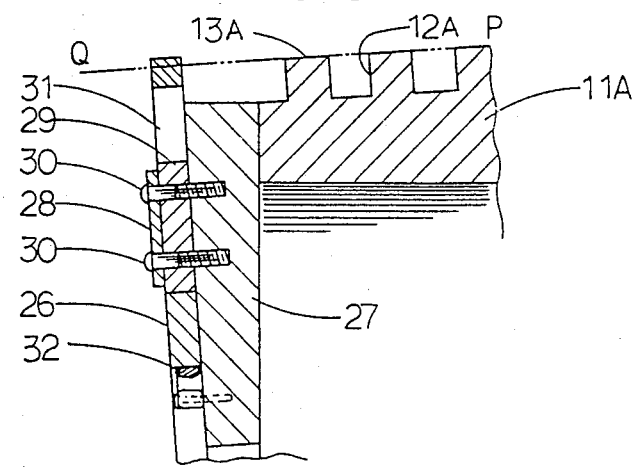

FIG. 8 and FIG. 9 represent the case wherein a set of segmental leaves (blades) 26 work as the guide means instead of the above-mentioned pilot ring, and the guide means is constituted such that a guide piece 29 with a retaining plate 28 is fixed on the surface of a disc baseplate 27 radially to divide the outer periphery into three equal parts, the guide piece 29 is engaged with a slit 31 formed radially to pass a segment center of each leaf 26, the leaf 26 is thus slidable radially on the surface of the baseplate 27, which is kept normally at a position projecting radially outside by a spring member 32 provided on the center side of the baseplate 27, and under the state above a nose circumference of each leaf 26 is kept at a position somewhat projecting from the circumference of a virtual circular truncated cone P - Q - R - S connecting crests 13A, 13A of a tapered external thread 12A in a tapered external thread gauge 11A as in the case of the above-mentioned embodiment. Further each leaf 26 runs to make nearly a round at the same pitch and the same lead angle as the tapered external thread 12A. Then, one face of the baseplate 27 is formed to a spiral seat surface, therefore a spiral body will be formed by putting together three pieces of the leaves 26 mounted on such baseplate 27, and these baseplates 27 are fixed concentrically on the nose surface of the tapered external thread gauge 11A by a suitable means. It can be mounted detachably on end surface of a thread gauge or the like as an adapter including the above-mentioned embodiment, therefore it can be applied simply on a ready-made product.

Next, an example of fitting inspection of a tapered internal thread gauge with a tapered internal thread provided on the inner periphery and a tool joint with a tapered external thread provided on the outer periphery will be described as another embodiment of this invention with reference to FIG. 10 and FIG. 11.

In both the drawings, a numeral 33 denotes a tapered internal thread gauge, which is provided with a tapered internal thread 34 having a crest 35 on the inner periphery. An adapter 37 is fixed concentrically with the tapered internal thread gauge 33 on a nose surface 36 by a suitable means. A numeral 38 denotes a concave groove provided on an inner periphery of the adapter 37, which is formed in section similarly to the above-mentioned concave groove 19, and also provided at the same pitch and the same lead angle as the tapered internal thread 34 for ready connection to the crest 35 of the tapered internal thread 34. A pilot ring 39 similar to the pilot ring 20 in the above-mentioned embodiment is fitted loosely in the concave groove 38 as a contractible guide means, the shape is rectangular in section and the inner periphery is semicircular (round angular shape and square shape with inner peripheral end R-shaped being acceptable), a diameter of the inner periphery is somewhat smaller than the diameter of circumference of a virtual circular truncated cone P - Q - R - S connecting the crests 35, 35 of the tapered internal thread 34. Further a diameter of the outer periphery is somewhat smaller than the bottom diameter of the concave groove 38 to cope with an expansion at the time of engagement. A thickness is then somewhat smaller than the width of the concave groove 38. It is formed in a coil long enough to surround an inner periphery of the adapter 37 at about one turn along the concave groove 38. Further both ends 39A, 39B are displaced by a distance corresponding to about one pitch of the tapered internal thread 34.

Figure 10:
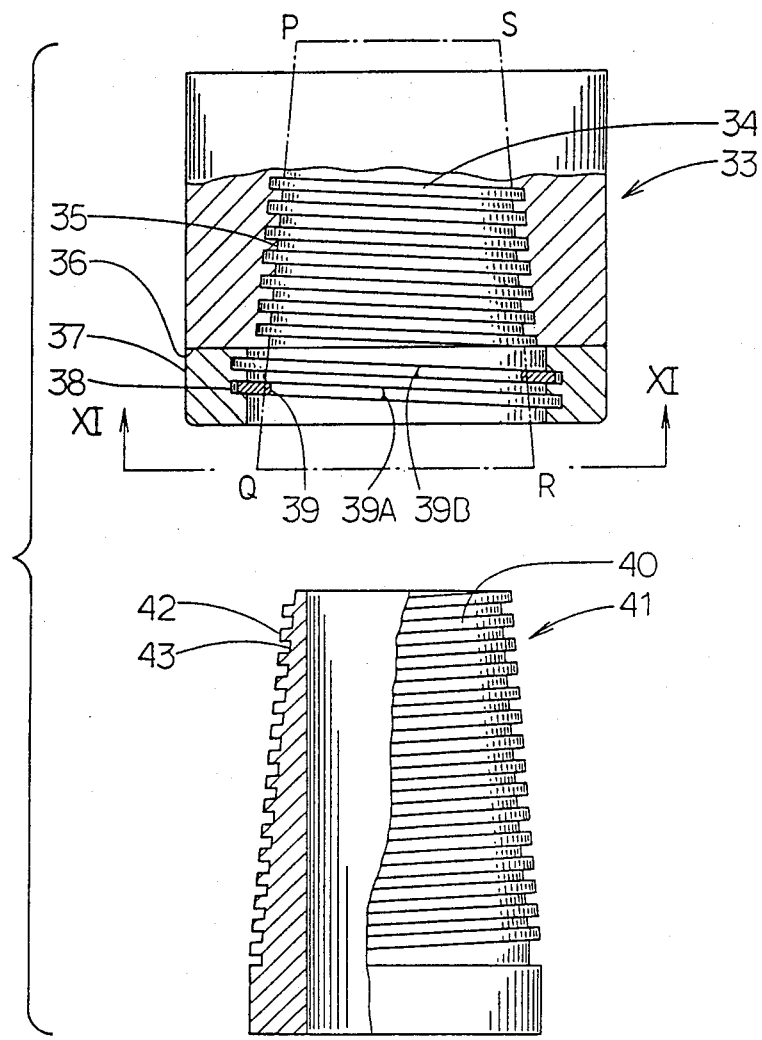
Figure 11:
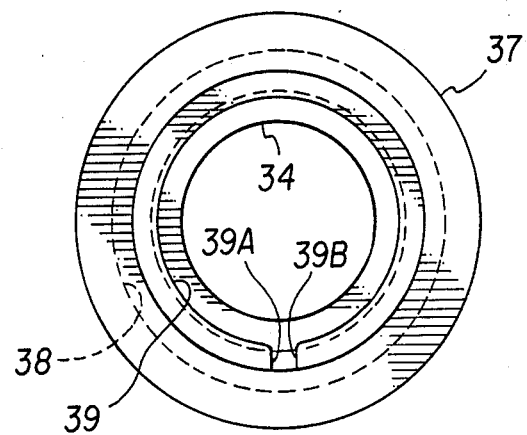

The tapered internal thread gauge 33 with such adapter 37 is disposed, as shown in FIG. 10, on almost the same shaft center as a tool joint 41 provided with a tapered external thread 40. Next the tapered internal thread gauge 33 is moved forward slowly toward the tool joint 41. Then the pilot ring 39, having a diameter of the inner periphery made somewhat smaller than the diameter of inner periphery of the above-mentioned virtual circular truncated cone P - Q - R - S, comes in contact with a crest 42 of the tapered external thread 40 immediately before the crest 35 of the tapered internal thread 34 contacts the crest 42 of the tapered external thread 40. Thus the pilot ring 39 is expanded a little outside according to its elastic action. Next, when the tapered internal thread gauge 33 is further moved a little forward, the pilot ring 39 is fitted in a root 43 of the tapered external thread 40, and contracted on its resilience to reset to an original state fitted loosely in the concave groove 38.

Consequently, pitches of the tapered threads of the tapered internal thread gauge 33 and the tool joint 41 can automatically be aligned. When the tapered internal thread gauge 33 is rotated to go further under such state, the crest 35 of the tapered internal thread 34 succeeding to the pilot ring 39 is induced to the root 43 of the tapered external thread 40 in the tool joint 41.

Therefore the tapered internal thread 34 and the tapered external thread 40 are adjusted onto the same shaft center despite a slight deviation from the shaft center between both the two, and thus the two are smoothly engaged with each other.

The tapered internal thread gauge 33 is then engaged with the tool joint 41 by having a necessary clamping torque given thereto. Whether or not a stand-off value at the time of clamping end comes within allowable limits is measured visually and so recorded. Then, the tapered internal thread gauge 33 is reversed to ascend and released from engagement with the tool joint 41, thus finishing the fitting inspection of the tapered external thread 40.

In the above embodiment, since the guide means can be mounted detachably on an end of the tapered internal thread gauge 33 as adapter, it can be applied straight on a ready-made tapered internal thread gauge.

Figure 12:
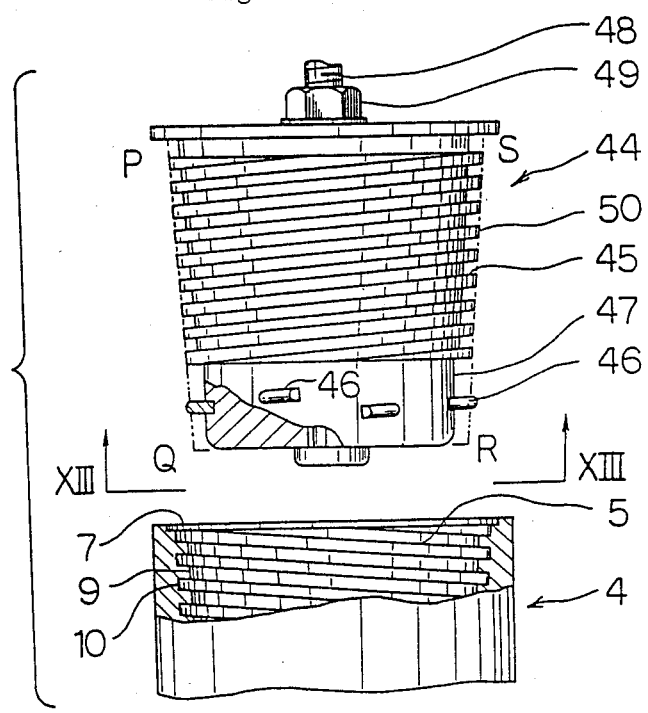
Figure 13:
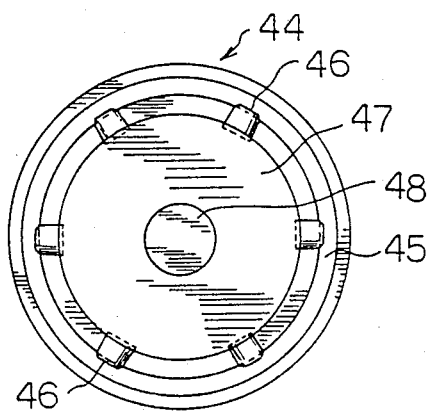

The embodiment given in FIG. 12 and FIG. 13 represents a case wherein an adapter 47 provided with an intermittent projection 46 as a guide means is mounted on an end of a tapered external thread gauge 44 with a tapered external thread 45 provided thereon, and the adapter 47 is fixed concentrically with the tapered external thread gauge 44 with a mounting member 48 and a nut 49 similar to the embodiment shown in FIG. 2. The intermittent projection 46 is disposed at the same pitch and the same lead angle as the tapered external thread 45 for ready connection to a crest 50 of the tapered external thread 45, comes on a virtual line extended from the crest 50 of the tapered external thread 45, arrayed preferably in a plural piece, as shown in FIG. 13, to make nearly a round of an outer periphery of the adapter 47, constituted of metal or other elastic material, movable resiliently back and forth radially at a position so arrayed on the adapter 47, rounded at the top and so high as to project somewhat outside from a virtual circular truncated cone P - Q - R - S connecting crests 50, 50 of the tapered external thread 45, and wide somewhat narrower than the width of the crest 50 of the tapered external thread 45. In a fitting inspection of tapered threads on the tapered external thread gauge 44, or a fitting inspection of the tapered internal thread 5 with the tapered internal thread coupling 4 which is similar to FIG. 1 as illustrated, the working mode is same as the above-mentioned embodiment, pitches of threads of the tapered external thread gauge 44 and the tapered internal thread coupling 4 are aligned automatically on the intermittent projection 46 working as a guide means. Thus the two are engaged smoothly with each other.

Figure 14:
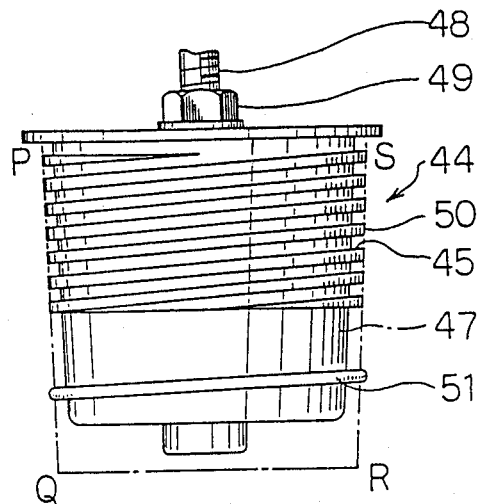

Next, the embodiment of FIG. 14 represents a case wherein the intermittent projection 46 of the guide means in FIG. 12 is made continuous in shape, providing a continuous projection 51 on the adapter 47 at the same pitch and the same lead angle as the tapered external thread 45 for ready connection to the crest 50 of the tapered external thread 45, the continuous projection 51 is disposed so as to make nearly a round of an outer periphery of the adapter 47. The top sectional form, height, material and others are similar to those of the intermittent projection 46, and the same effect will be obtainable in operation.

The above refers to embodiments on the tapered thread gauge, and the case where the invention is applied on a protector for tapered threads will be described next with reference to the drawings.

Figure 15:
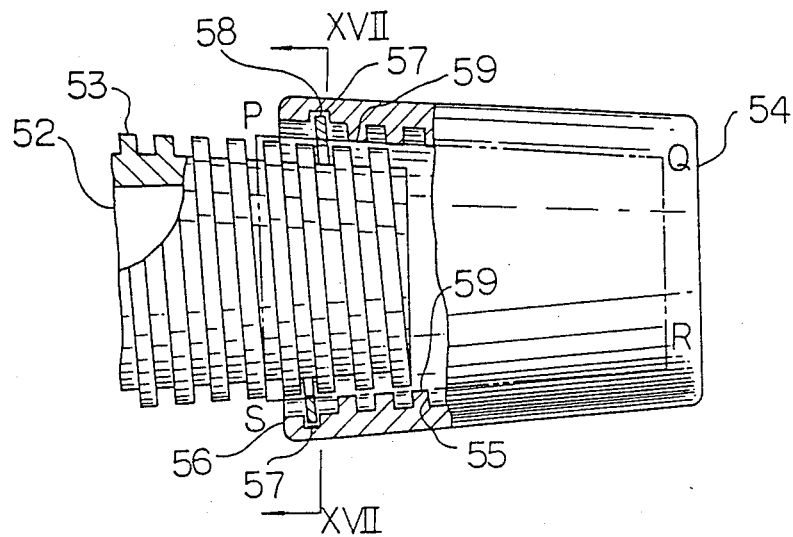
Figure 16:
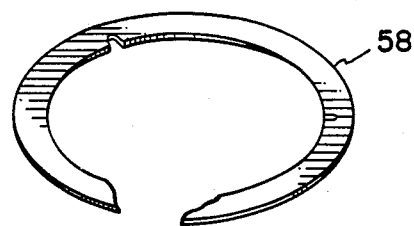
Figure 17:
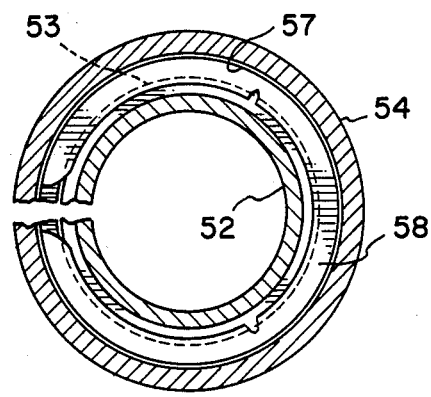

In FIG. 15 to FIG. 17, a numeral 52 denotes a pipe such as fuel pipe, oil pipe or the like, a tapered external thread 53 is provided on an outer periphery of the pipe 52, and a numeral 54 denotes a cuplike protector for protecting a tapered external thread 53 on an end of the pipe 52 with a tapered internal thread 55 provided on the inner periphery. A predetermined depth, width and length of concave groove 57 is formed on a part of a crest of the tapered internal thread 55 positioned near an opening end of the protector 54, a guide means consisting of a metallic pilot ring 58 which is formed in about one round of coil as shown in FIG. 16 is fitted in the concave groove 57, and the pilot ring 58 is fitted loosely in the concave groove 57 contractibly on its elasticity (FIG. 17 representing a longitudinal section taken on line XVII—XVII of FIG. 15). The pilot ring 58 then has a diameter of the inner periphery made smaller than the diameter of a circumference of virtual circular truncated cone P - Q - R - S formed by connecting crests 59, 59 of the tapered internal thread 55.

An operating mode of the protector 54 as a tapered screw member is almost the same as in the case of the tapered internal thread gauge 33 of FIG. 10, pitches of both the tapered threads are aligned automatically by the pilot ring 58 working as a guide means, and thus the protector 54 is screwed smoothly on an end of the pipe 52.

Figure 18:
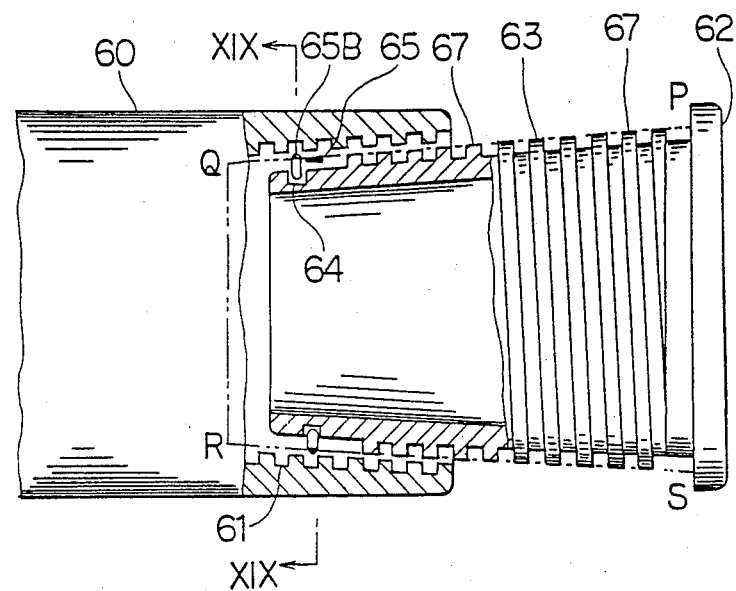
Figure 19:
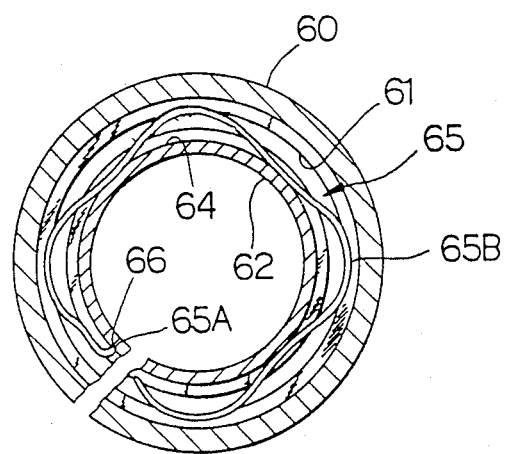

FIG. 18 and FIG. 19 represent a coupling with a tapered internal thread provided on the inner periphery and a protector which is a tapered screw member used for protection of the tapered internal thread with a tapered external thread provided on the outer periphery.

In both the drawings, a numeral 60 denotes a coupling for pipes which is provided with a tapered internal thread 61 on the inner periphery of its one end, a numeral 62 denotes a cuplike protector for protection of the tapered internal thread. A tapered external thread 63 is provided on an outer periphery of the protector 62 barring a part of the side whereon the tapered internal thread 61 is engaged. In the portion where the tapered external thread is not provided, there is provided a concave groove 64 at a position on a virtual extension of the crest and also at the same lead angle for ready connection with the tapered external thread 63. A guide means consisting of a linear body 65 such as metallic wire or the like which is formed in about one roll of meandering coil as shown in FIG. 19 is locked in the concave groove 64 by having its end 65A fitted in a lock hole 66 perforated in the concave groove 64, and is so provided that the outer diameter is ready for contracting and resetting on elasticity. Further, a diameter of the outer periphery in a convexity 65B of the linear body 65 is made larger than the diameter of inner periphery of a virtual circular truncated cone P - Q - R - S formed by connecting crests 67, 67 of the tapered external thread 63, and an operating mode of the protector 62 constituted as above is almost the same as in the case of the tapered external thread gauge 11 of FIG. 2, pitches of both the tapered threads are aligned automatically by the linear body 65 working as a guide means, and thus the protector 62 is screwed smoothly on the coupling 60.

Figure 20:
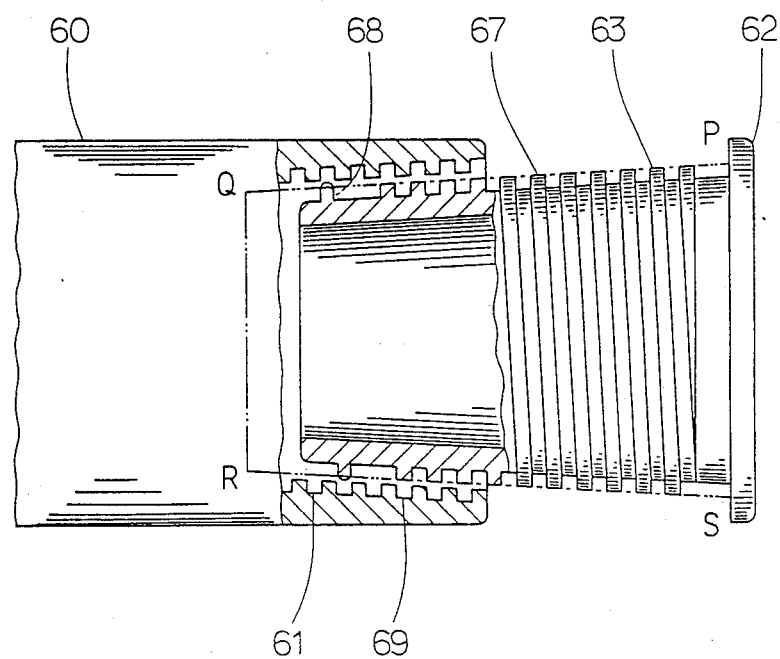

FIG. 20 then represents an embodiment wherein the guide means is provided solidly with the tapered screw member, a guide means consisting of a threadlike projecting streak 68 ready for elastic deformation or plastic deformation, is provided solidly covering the length of about one roll on the protector 62 screwed on the tapered internal thread 61 of the coupling 60 similar to the above-mentioned embodiment at a portion coming on an engaged side with the tapered internal thread 61 and having no tapered external thread 63 provided thereon and at a position on a virtual extension of the crest for ready connection with the tapered external thread 63 and further at the same lead angle. A diameter of outer periphery of the projecting streak 68 is made somewhat larger than the diameter of a circumference of the above-mentioned virtual circular truncated cone P - Q - R - S. It is formed to an angular shape with the upper surface rounded, the projecting streak 68 comes in contact with the tapered internal thread 61 to elastic deformation or plastic deformation at the time of engagement and then it is fitted in a root 69 of the tapered internal thread 61, pitches of both the tapered threads are aligned automatically likewise, and thus the threads are engaged smoothly.

Figure 21:
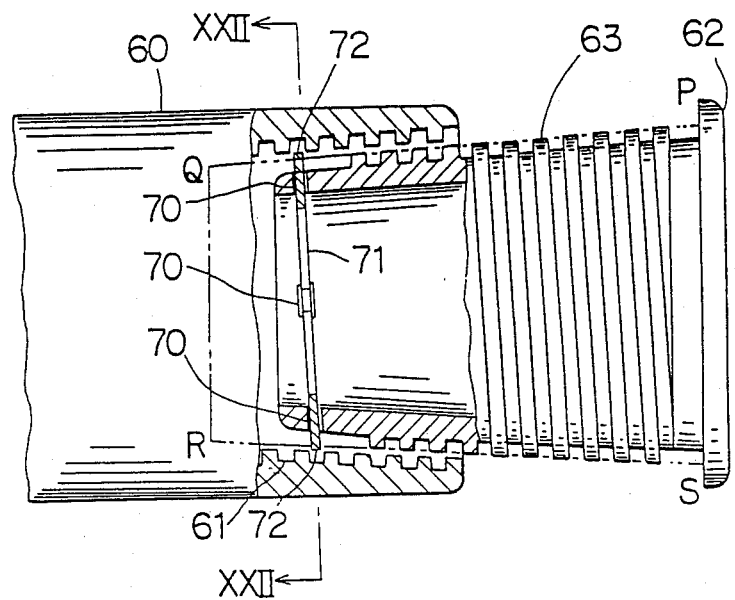
Figure 22:
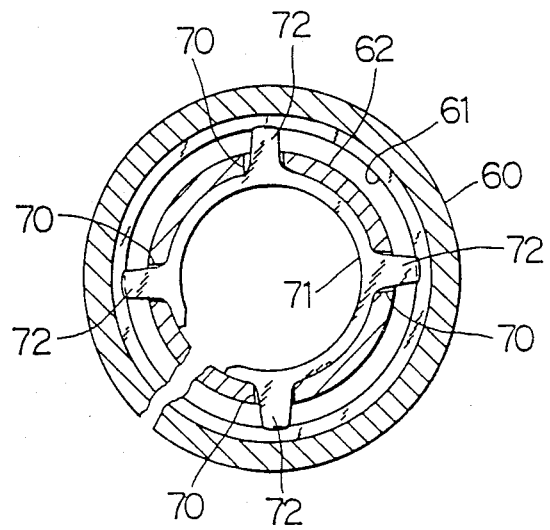

Next FIG. 21 and FIG. 22 represent the case of an embodiment of the tapered screw member in the shape of C-ring, snap ring or the like with a predetermined height of projection formed in a suitable number on the outer periphery, which works on a ring body ready for expanding and resetting the outer diameter on elasticity as a guide means. Predetermined number of fitting holes 70 are perforated in the protector 62 to be screwed on the tapered internal thread 61 of the coupling 60 similar to that of the above-mentioned embodiment at a portion coming on an engaged side with the tapered internal thread 61 and having no tapered external thread 63 provided thereon and at a position on a virtual extension of the crest for ready connection with the tapered external thread 63 and further at the same lead angle. A numeral 71 denotes a ring body consisting of an elastic material formed like C-ring, snap ring or the like, a suitable number of projections 72 ready for fitting in the holes 70 are formed on an outer periphery of the ring body 71 to constitute a guide means, the ring body 71 is pressed inside with a tool and inserted inside the protector 62 from having the outer diameter made smaller against the resilience, each projection 72 is fitted in the corresponding fitting hole 70 and then it is released from being pressed as above, the ring body 71 is expanded and reset on its resilience and thus kept locked on the inside of the protector 62, further each projection 72 is projected from the fitting hole 70 in the state ready for moving longitudinally on elasticity of the ring body 71. Then, a diameter of the outer periphery of a nose of the projection 72 is made larger than a circumference of the virtual circular truncated cone P - Q - R - S, an operating mode of the protector 62 thus constituted is almost the same as in the case of embodiment of FIG. 2, pitches of both the tapered threads are aligned automatically by the ring body 71 working as a guide means, and thus the protector 62 is engaged smoothly with the coupling 60.

Figure 23:
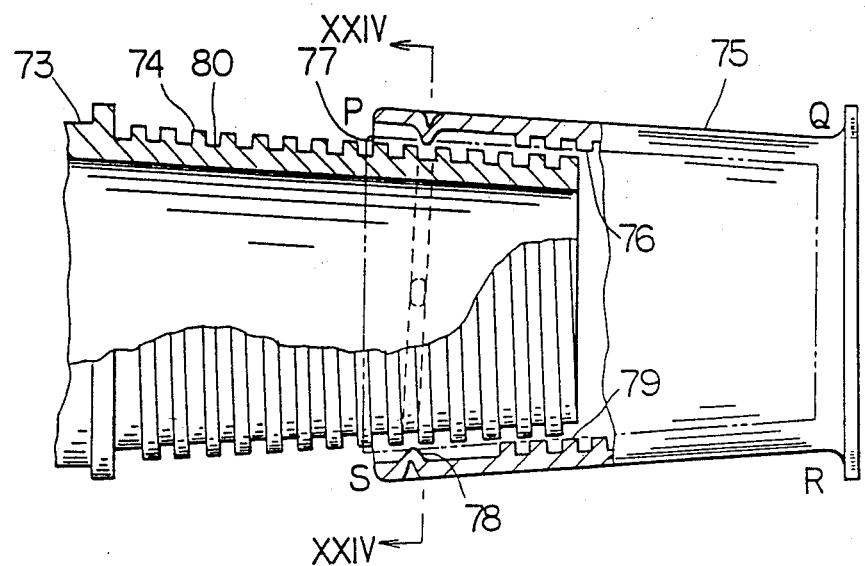
Figure 24:
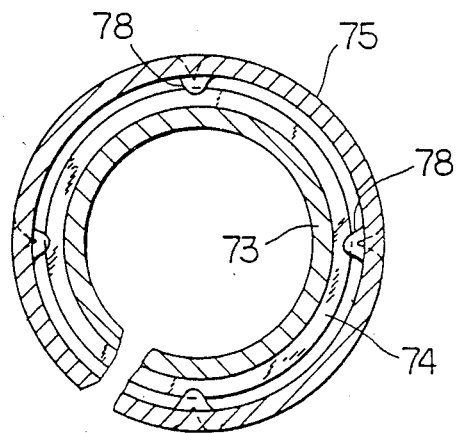

Furthermore, the embodiment given in FIG. 23 and FIG. 24 represents a case where a guide means is projected solidly at a predetermined height through pressing or the like on the tapered screw member with a tapered internal thread provided on the inner periphery, a tapered external thread 74 is provided on the outer periphery of one end of a pipe 73 such as fuel pipe, oil pipe or the like, and a tapered internal thread 76 is provided on the inner periphery of a protector 75 which is the tapered screw member corresponding thereto. Further, a guide means constituted of a predetermined number of projections 78 tonguing through pressing and ready for plastic deformation or elastic deformation is provided on an opening end 77 side of the tapered internal thread 78 which is near to an engaged side with the tapered external thread 74 at a position on a virtual extension of the crest for ready connection to the tapered internal thread 76. Then, a nose side of the projection 78 is projected inside from circumference of a virtual circular truncated cone P - Q - R - S formed by connecting crests 79, 79 of the tapered internal thread 76. The projection 78 comes in contact with the tapered external thread 74 to plastic deformation or elastic deformation at the time of engagement, and then the protector 75 of such constitution is fitted in a root 80 of the tapered external thread 74, pitches of both tapered threads are aligned automatically likewise, and thus the threads are engaged smoothly. Then instead of forming the projection 78 on press, the projection can be fixed through weld, adhesion or the like at a predetermined position to work as a guide means.

Figure 25:
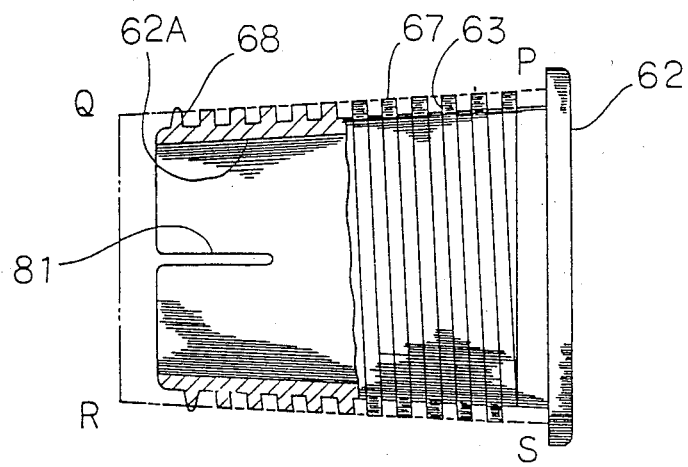

In case the guide means is provided solidly on an end of the tapered screw member like the embodiment of FIG. 20 or FIG. 23, the embodiment given in FIG. 25 is that in which a predetermined length of slit is formed in a suitable number on an end of a tapered screw member body 62A of the side whereon the guide means is provided axially thereof, and thus a guide means formed side of the tapered screw member is kept ready for elastic deformation, a guide means consisting of the projecting stream 68 of a lead angle is provided solidly covering the length of about one roll on the protector 62 similar to that of the above-mentioned embodiment at a position on a virtual extension of the crest for ready connection to the tapered external thread 63, a diameter of outer periphery of the projecting streak 68 is made somewhat larger than the diameter of a circumference of the virtual circular truncated cone P - Q - R - S, the shape is given in angle with the upper surface rounded, and a predetermined length of slit 81 is formed axially in a suitable number on the side where the projecting streak 68 of such protector 62 is provided.

When the protector 62 of such constitution is engaged with a suitable coupling, the projecting streak 68 comes in contact with the tapered internal thread of another tapered screw member (not illustrated), thus the projecting streak 68 side of the protector 62 is subjected to elastic deformation somewhat inside for presence of the slit 81, and further by moving the protector 62 forward, the projecting streak 68 is fitted in a root of the other tapered internal thread, the projecting streak 68 side resets to an original state on its resilience, pitches of both the tapered threads are aligned automatically as in the case of other embodiments, and thus the protector 62 can be engaged smoothly. Then, this embodiment refers to the case of a protector provided with a tapered external thread, however, it can also be applied to the case of a tapered internal thread type protector likewise.

The guide means in the above each embodiment is provided on either one of a pair of tapered threads, however, it can be provided on both tapered threads, further the guide means can be provided on a plural portion to say nothing of one portion, and in case the guide means is provided on a pipe end like the embodiment of FIG. 8 and FIG. 9, the end of the pipe, if thin, can be bent radially outside to form the guide means directly thereon, which can be applied to the case where the projection in the embodiment of FIG. 23 or the projecting streak in the embodiment of FIG. 25 is formed on a pipe end, and if so, then the pipe end is a spiral inclined plane.

Further in the above embodiments on tapered thread gauges, the guide means is provided on the adapter, however, a similar guide means can be provided on the tapered thread gauge body otherwise.

Figure 26:
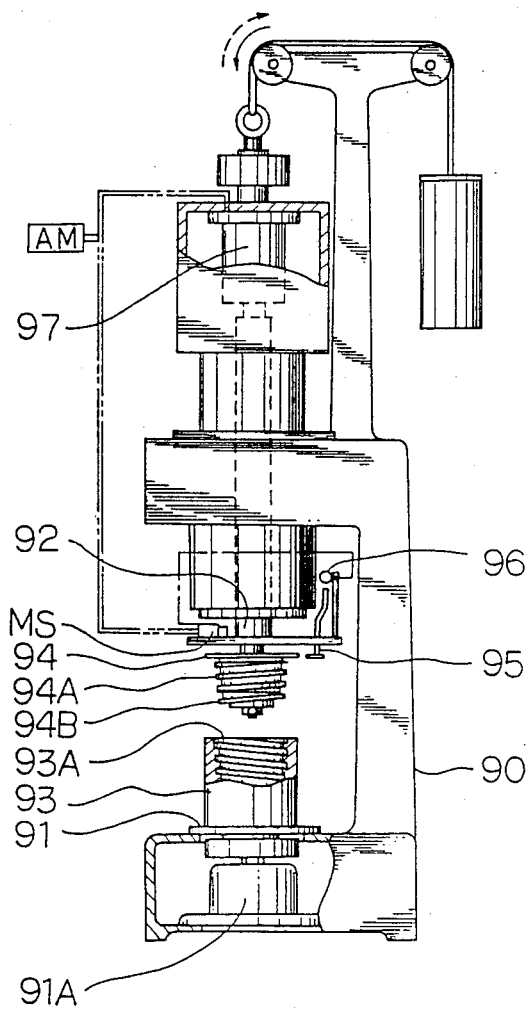

FIG. 26 represents a fitting inspection apparatus for carrying out automatically a fitting inspection according to tapered screw members with various kinds of guide means, and the fitting inspection apparatus is provided with a grasping arrangement 91 having a chuck mechanism 91A on the lower side of a frame 90 and is also framed to have a spindle 92 supported elevatingly and rotatably as concentrical over the grasping arrangement 91, and a tapered thread fitting inspection according to the fitting inspection apparatus will be described next with reference to a coupling for example.

First, a coupling 93 provided with a tapered internal thread 93A on the inner periphery is mounted on the grasping arrangement 91 through the chuck mechanism 91A, a tapered external thread 94A capable of engaging with the tapered internal thread 93A is provided on the outer periphery, and further a tapered thread gauge 94 with a guide means 94B provided on the nose is mounted on a lower end of the spindle 92. Next, when the spindle 92 is moved to descent on an elevator (not illustrated) to bring the guide means 94B of the tapered thread gauge 94 into contact with the tapered internal thread 93A of the coupling 93, the guide means 94B is fitted in a root of the tapered internal thread 93A, as described in each embodiment mentioned hereinabove, and when the spindle 92 is rotated to descend in succession, the tapered thread gauge 94 is engaged smoothly with the coupling 93 according to the guide means 94B, thus the engaging process goes on a predetermined torque and a stand-off value is indicated according to a detecting rod 95 and a dial gauge 96. Next, when a torque motor 97 for running the spindle 92 is reversed by putting on a reversing switch, the the elevator of the spindle 92 operates also reversely, the spindle 92 then ascends as reversed to release engagement of the tapered thread gauge 94 and the coupling 93, the fitting inspection is carried out during the period, and a clamping torque value and a stand-off value as indexing a fitting precision or an interchangeability of the tapered internal thread 93A and the tapered external thread 94A are thus measured. The coupling 93 for which the fitting inspection is over is then drawn out of the grasping arrangement 91 through the chuck mechanism 91A and delivered to the next process, and the tapered thread gauge 94 resets to an original upper position, on the other hand.

The above-mentioned embodiment then refers to a vertical inspection system, however, similar control operation and control with instrumentation will be obtainable from changing it to a horizontal system, and the protector can be screwed simply on a drill pipe by fixing the drill pipe (such as casing pipe or the like) instead of the coupling to be inspected on the frame 90 and mounting the protector instead of the tapered thread gauge on the spindle 92, therefore the fitting inspection apparatus can be applied as an engaging apparatus for tapered screw members, which may cover the case of internal thread gauges likewise.

As described above, the tapered screw member according to this invention is provided with a guide means for inducing engagement to a position for connection to a crest of tapered thread, the guide means is first fitted in a root of another thread, or detects automatically a portion whereat engagement of a crest of the tapered thread is commenced, the tapered screw member is then rotated and the crest of the tapered thread is induced to the root of other tapered thread to a smooth fitting therein. Thus "biting phenomenon" described hereinabove and the like will not take place and the tapered thread surface will not be damaged, moreover both members are centered to a smooth engagement by induction of the guide means despite deviation from the shaft center arising somewhat between both the tapered internal thread member and tapered external thread member before engagement, thus a remarkable effect that an engagement working efficiency can be enhanced will be secured thereby, and the effect is particularly conspicuous for buttless threads, further it is suitable for site operation or the like under severe conditions.

What is claimed is:

1. In a tapered screw member provided with a tapered thread, the improvement characterized in that a guide means for inducing thread engagement is positioned on an extension from said tapered thread and in a groove formed on a portion of said extension, said guide means in said groove having a projection height higher than the height of the nearest crest of said tapered thread for engaging the thread of a receiving member and guiding said nearest crest of said tapered thread into thread engagement with the thread of a member into which said tapered screw member is being threaded.

2. The tapered screw member as defined in claim 1, wherein the guide means is constituted of an elastic material such as metal, plastics, rubber or the like.

3. In a tapered screw member provided with a tapered thread, the improvement characterized in that a guide means for inducing thread engagement is positioned on an extension from said tapered thread and in a groove formed on a portion of said extension, said guide means having a projection height higher than the height of the nearest crest of said tapered thread, said guide means being in a threaded adapter guide mounted on the end of the tapered screw.

4. The tapered screw member as defined in claim 1 or 2, wherein the guide means is a continuous projection.

5. The tapered screw member as defined in claim 1 or 2, wherein the guide means comprises an annular body formed in about one roll of coil.

6. The tapered screw member as defined in claim 1, wherein the guide means comprises a ring body having elasticity with a predetermined height of projection formed peripherally.

7. In a tapered screw member provided with a tapered external thread for threading engagement with internal threads on a receiving member, the improvement characterized in that a guide means for inducing thread engagement is positioned on one of said members, said guide means having a projected height higher than the height of the crest of the immediately adjacent thread on said one of said members for engaging the thread of said receiving member and guiding said immediately adjacent thread into engagement with said threads on said receiving member.

8. The tapered screw member is defined in claim 3 wherein said guide means is constituted of an elastic material such as metal, plastics, rubber or the like.

9. The tapered screw member as defined in either claim 3 or claim 8 wherein the guide means is a continuous projection.

10. The tapered screw member as defined in either claim 3 or claim 8 wherein the guide means comprises an annular body formed in about one roll of coil.

11. The tapered screw member as defined in either claim 3 or claim 8 wherein the guide means comprises a ring body having elasticity with a predetermined height of projection formed peripherally.

* * * * *

UNITED STATES PATENT AND TRADEMARK OFFICE
CERTIFICATE OF CORRECTION

PATENT NO. : 4,818,167
DATED : April 4, 1989
INVENTOR(S) : Seiji HATSUTORI

It is certified that error appears in the above-identified patent and that said Letters Patent is hereby corrected as shown below:

On the cover page, Item [30], line 2, "Feb. 18, 1982" should read --Feb. 18, 1983--.

Signed and Sealed this

Third Day of October, 1989

Attest:

DONALD J. QUIGG

*Attesting Officer*  *Commissioner of Patents and Trademarks*